United States Patent [19]

Miller

[11] Patent Number: 4,727,815
[45] Date of Patent: Mar. 1, 1988

[54] CORNER SHELF ASSEMBLY

[76] Inventor: Stephen A. Miller, P.O. Box 28, New Brunswick, N.J. 08903

[21] Appl. No.: 52,512

[22] Filed: May 21, 1987

Related U.S. Application Data

[63] Continuation-in-part of Ser. No. 915,425, Oct. 6, 1986, abandoned, and Ser. No. 767,086, Aug. 19, 1985, abandoned, said Ser. No. 915,425, is a continuation-in-part of Ser. No. 767,086.

[51] Int. Cl.⁴ ............................................. A47B 23/00
[52] U.S. Cl. ..................................... 108/42; 248/220.1
[58] Field of Search ............... 108/42, 152, 134, 135; 248/248, 250, 220.18, 247, 263, 108; 211/186, 90, 135; 312/263

[56] References Cited

U.S. PATENT DOCUMENTS

| | | | |
|---|---|---|---|
| 814,811 | 3/1906 | Speed | 108/42 X |
| 975,619 | 11/1910 | Hollander | 108/42 |
| 1,286,588 | 12/1918 | Goodykoontz | 108/42 X |
| 2,219,975 | 10/1940 | Bentz | 108/42 X |
| 2,261,078 | 10/1941 | Shockey | 108/42 |
| 2,289,451 | 7/1942 | Porcelli | 108/42 |
| 2,340,545 | 2/1944 | Marsh | 248/220.1 X |
| 2,465,635 | 3/1949 | Conterio | 108/42 |
| 3,033,376 | 5/1962 | Eastman | 108/42 |
| 3,204,905 | 9/1965 | Marban | 248/188 |
| 3,979,098 | 9/1976 | Vattier | 248/247 |
| 3,999,236 | 12/1976 | Macauley | 248/188 X |
| 4,334,483 | 6/1982 | Kellogg | 248/250 X |

FOREIGN PATENT DOCUMENTS 637570  5/1950  United Kingdom ................ 248/188

Primary Examiner—Kenneth J. Dorner
Assistant Examiner—José V. Chen
Attorney, Agent, or Firm—Sperry, Zoda & Kane

[57] ABSTRACT

A corner shelf assembly particularly usable mounted to a wall corner having two walls surfaces arranged approximately perpendicular with respect to one another. The assembly includes a bracket having two plates approximately 90 degrees with respect to one another and each secured to one other along an inner end and having a lip means secured along the outer end. A shelf having a floor member with a mounting means located behind the floor member adjacent to the rear surfaces which will abut the perpendicular wall surfaces. A mounting recess is defined between the rear abutment surfaces and includes defined therein two slots adapted to receive therein the outwardly extending lip sections of the bracket in such a manner as to fixedly engage the shelf with respect to the wall corner area and to allow the entire mounting bracket to be positioned within the recess to allow the abutting surfaces to make direct abutting contact with respect to the surrounding wall.

12 Claims, 6 Drawing Figures

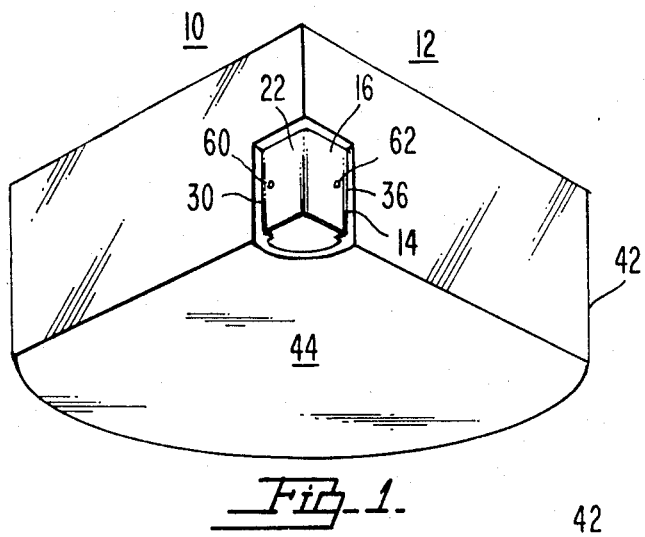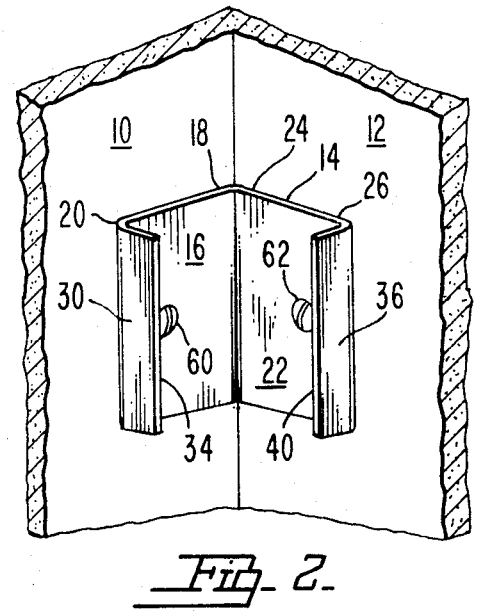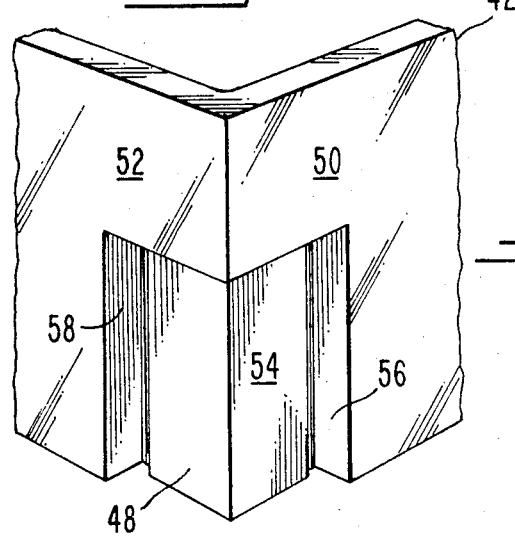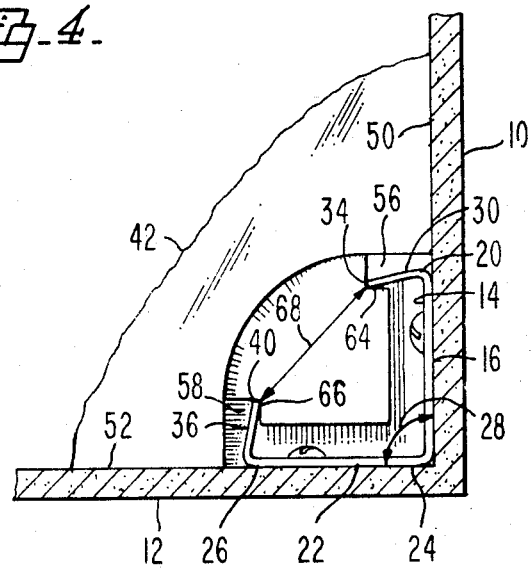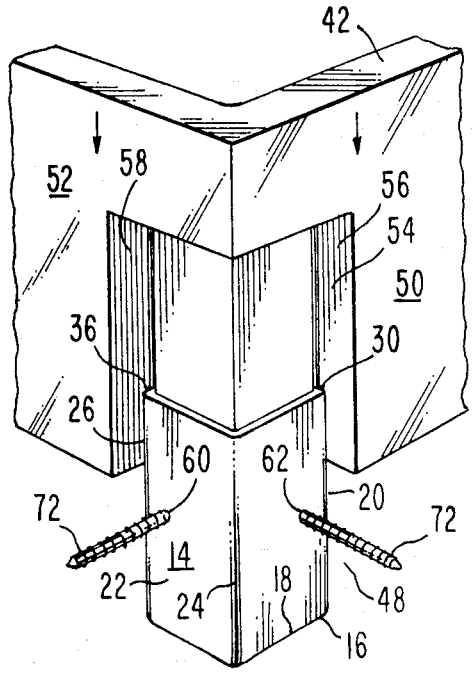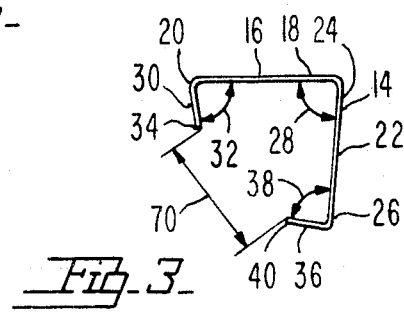

CORNER SHELF ASSEMBLY

This application is a continuation-in-part of U.S. Ser. No. 915,425 filed Oct. 6, 1986, now abandoned. The present application is also a continuation-in-part of U.S. Ser. No. 767,086 filed Aug. 19, 1985, now abandoned. U.S. Ser. No. 915,425 filed Oct. 6, 1986 is, itself, a continuation-in-part of U.S. Ser. No. 767,086 filed Aug. 19, 1985 and as such the present application is a continuation-in-part of U.S. Ser. No. 915,425 filed Oct. 6, 1986 and its parent application U.S. Ser. No. 767,086 filed Aug. 19, 1985.

BACKGROUND OF THE INVENTION

1. Field Of The Invention

The present invention deals with the field of shelving devices adapted to be mounted upon wall areas. Such devices normally include support members to give support to the shelf as well as a bracket adapted to be secured with respect to the wall to facilitate mounting of the shelf thereon.

The present invention further particularly pertains to those devices adapted to be secured in a corner wall area wherein two walls intersect at a angle approximately 90 degrees. Furthermore the present invention is particularly pertinent to bathroom wall areas where the walls themselves are covered with some type of tiling which thereby requires that the outer edges of the shelf construction be in close proximity or direct abutment with respect to the tile on the walls in such a manner as to allow for caulking to completely surround the shelf to prevent the movement of water adjacent to the bracket or wall support member to thereby prevent the passage of water through any holes which may be necessary to drill into the tiles. In this manner mildew or rusting of the attachment members will be prevented. These problems are common to such insulations in bathrooms and powder rooms where heavy amounts of moisture occur.

2. Description of the Prior Art

Certain devices have been patented which are designed to provide mounting means in corner areas utilizing various types of construction. Examples of such devices are as shown in U.S. Pat. No. 577,222 patented Feb. 16, 1897 to S. F. Wray; and U.S. Pat. No. 814,811 patented Mar. 13, 1906 to J. Speed; U.S. Pat. No. 1,030,905 patented July 2, 1912 to H. M. Lucas; U.S. Pat. No. 1,286,588 patented Dec. 3, 1918 to F. A. Goodykoontz; U.S. Pat. No. 1,654,409 patented Dec. 27, 1927 to T. C. Browne; U.S. Pat. No. 2,036,184 patented Apr. 7, 1936 to M. Armstrong; U.S. Pat. No. 2,219,975 patented Oct. 29, 1940 to G. B. Bentz; U.S. Pat. No. 2,340,545 patented Feb. 1, 1944 to F. D. Marsh; U.S. Pat. No. 2,828,044 patented Mar. 25, 1958 to R. H. Reiss et al; U.S. Pat. No. 3,160,453 patented Dec. 8, 1964 to L. E. Tassell; U.S. Pat. No. 3,193,848 patented July 13, 1965 to W. G. Levy; U.S. Pat. No. 3.204,905 patented Sept. 7, 1965 to J. G. Marban; U.S. Pat. No. 3,281,102 patented Oct. 25, 1966 to C. W. Hobson; U.S. Pat. No. 3,308,963 patented Mar. 14, 1967 to H. S. Peacock; U.S. Pat. No. 3,399,912 patented Sept. 3, 1968 to P. Maspero; U.S. Pat. No. 3,979,098 patented Sept. 7, 1976 to C. Vattier; U.S. Pat. No. 3,999,236 patented Dec. 28, 1976 to C. Macauley; U.S. Pat. No. 4,230,052 patented Oct. 28, 1980 to G. Champagne; U.S. Pat. No. 4,334,483 patented June 15, 1982 to H. Kellogg; U.S. Pat. No. 4,408,812 patented Oct. 11, 1983 to J. Krautwurst; British Pat. No. 637,570 published May 24, 1950 to R. E. Winterton.

SUMMARY OF THE INVENTION

The present invention provides a corner shelf assembly which is adapted to be mounted to a wall corner having two wall surfaces intersecting with respect to one another in the corner area at an angle of approximately 90 degrees with respect to one another. A bracket is included in the corner shelf assembly which includes a first plate securable with respect to one of the wall surfaces and defining a first inner edge and a first outer edge thereon. A second plate is preferably integral with respect to the first plate along the first inner edge thereof such as to form an approximately 90 degrees orientation with respect to the other plate means. These plates preferably include apertures therein to facilitate securement directly with respect to the two intersecting wall surfaces of the wall corner.

A first lip is preferably integral with respect to the outer edge of the first plate and extending outwardly therefrom at an angle of somewhat less than 90 degrees, preferably approximately 80 degrees with respect thereto. The first lip also defines a first abutment edge at the outer end thereof opposite from the first plate. A second lip is also included attached to the second outer edge of the second plate and extends outwardly therefrom at approximately 80 degrees with respect thereto. The second lip similarly defines a second abutment edge at the outermost end thereof spatially disposed with respect to the second plate.

A shelf member is included having a floor member extending generally horizontally to provide the surface for placement of items upon the shelf. A mounting means is located behind the floor member between the wall surfaces and the floor member. The mounting means preferably includes a first abutment surface adapted to be positioned directly in abutment with respect to one of the wall surfaces. The mounting means also includes a second abutment surface positionable in abutment with respect to the other wall surface and oriented at approximately 90 degrees with respect to the first abutment surface to thereby provide a continuous contact of the corner shelf assembly with respect to the surrounding wall corner surfaces.

Mounting means further defining a mounting recess positioned between the first abutment surface and the second abutment surface which is adapted to receive the bracket therein in such a manner as to be fixedly secured thereto for mounting the shelf fixedly with respect to the wall corner wherein the first abutment surface is in continuous contact with one of the wall surfaces and wherein the second abutment surface is in continuous abutment with respect to the other wall surface.

The fixed securement between the bracket and the recess is made possible by a first slot defined within the mounting recess adjacent to the first abutment surface. This first slot is adapted to receive the first lip means fixedly secured therein. Similarly a second slot is located within the mounting recess adjacent the second abutment surface and is adapted to receive the second lip fixedly secured therein.

In the preferred configuration the first lip, the first plate, the second plate and the second lip are all integral with respect to one another and are preferably made of a material such as heat tempered metal for additional strength. Furthermore the first plate and the second plate preferably define mounting holes therein which are adapted to receive mounting screws extending therethrough into the wall surfaces of the corner wall area to facilitate fixed mounting of the bracket with respect to the corner. In this mounted configuration it is preferable that the bracket is adapted to be completely located within the mounting recess in such a manner as to facilitate flush contact of the first abutment surface with respect to the wall surface and of the second abutment surface with respect to the other wall surface.

Preferably the first lip is oriented at an angle of approximately 80 degrees with respect to the first plate and the second lip is oriented approximately 80 degrees with respect to the second plate. This configuration has been shown to allow for more fixed securement of the bracket with respect to the shelf. Furthermore the first slot preferably will define a first innermost corner and a second slot will define a second innermost corner. The first innermost corner being adapted to be engaged with the first abutment edge of the first lip and the second innermost corner defined by the second slot means adapted to engage the second abutment edge of the second lip means in such a manner as to fixedly engage the mounting means with respect to the bracket. In the preferred configuration the distance between the first innermost corner and the second innermost corner will be somewhat larger than the distance between the first abutment edge and the second abutment edge of the bracket when in the relaxed state in order to allow some outward flexing of the first abutment edge with respect to the second abutment edge to allow for a gripping effect within the mounting means to facilitate securement.

It is an object of the present invention to provide a corner shelf assembly adapted to be mounted to a wall corner having a first wall surface and a second wall surface wherein a corner shelf can be mounted with the rear portions thereof in flush abutment with respect to the wall surfaces thereof to facilitate caulking therebetween.

It is an object of the present invention to provide a corner shelf assembly adapted to be mounted to a wall corner having a first wall surface and a second wall surface wherein a bracket means secured with respect to the surrounding wall area is included for mounting thereof which is completely receivable within a recess defined in the rear portion of the shelving to allow for flush mounting thereof against the wall areas.

It is an object of the present invention to provide a corner shelf assembly adapted to be mounted to a wall corner having a first wall surface and a second wall surface wherein a mounting bracket is utilized of heat tempered steel to facilitate the strength of mounting of the corner shelf.

It is an object of the present invention to provide a corner shelf assembly adapted to be mounted to a wall corner having a first wall surface and a second wall surface wherein a simple yet very strong design for mounting is utilized.

It is an object of the present invention to provide a corner shelf assembly adapted to be mounted to a wall corner having a first wall surface and a second wall surface wherein maintenance requirements of the mounting system are virtually eliminated.

It is an object of the present invention to provide a corner shelf assembly adapted to be mounted to a wall corner having a first wall surface and a second wall surface wherein cost of construction is minimized.

It is an object of the present invention to provide a corner shelf assembly adapted to be mounted to a wall corner having a first wall surface and a second wall surface wherein time and cost of installation is minimal.

It is an object of the present invention to provide a corner shelf assembly adapted to be mounted to a wall corner having a first wall surface and a second wall surface wherein complete installation can be achieved merely by the use of a screwdriver and two to six mounting screws.

It is an object of the present invention to provide a corner shelf assembly adapted to be mounted to a wall corner having a first wall surface and a second wall surface wherein a rearwardly positioned bracket is usable with a flush mounted shelf.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a perspective illustration of an embodiment of the corner shelf assembly of the present invention;

FIG. 2 is a perspective illustration of an embodiment of the bracket of the corner shelf assembly of the present invention shown in the installed position;

FIG. 3 is a top plan view of an embodiment of the bracket of the corner shelf assembly of the present invention;

FIG. 4 is a rear plan view of an embodiment of the mounting means of the corner shelf assembly of the present invention;

FIG. 5 is a bottom plan view of an embodiment of the corner shelf assembly of the present invention shown in the installed position; and FIG. 6 is a rear perspective illustration of an embodiment of the corner shelf assembly of the present invention shown partially installed.

DETAILED DESCRIPTION OF THE PREFERRED EMBODIMENT

The present invention provides a corner shelf assembly which is particularly adapted to be mounted to a wall corner having a first wall surface 10 and a second wall surface 12 intersecting at approximately 90 degrees with respect to one another to form the wall corner.

A bracket means 14 is adapted to be secured with respect to the first wall surface 10 and the second wall surface 12 by any conventional available means. Bracket 14 includes a first plate 16 and a second plate 22. First plate 16 includes a first inner edge 18 and a first outer edge 20 both of which extend vertically. The second plate means 22 includes a second inner edge 24 and a second outer edge 26. The first plate means 16 and the second plate means 22 are secured with respect to one another along the first inner edge 18 and the second inner edge 24 respectively thereof. The first plate 16 and the second plate 22 may be integral with respect to one another such as to be formed as a single part to form an L-shaped bracket. Preferably the first plate 16 and the second plate 22 are at right angles with respect to one another to conform to the general 90 degrees angle of intersection between the first wall surface 10 and the second wall surface 12.

The bracket means of the present invention further includes a first lip means 30 extending outwardly from the first outer edge 20 of first plate 16. First lip means 30 includes a first abutment edge 34 at the vertically extending edge thereof in position away from the first plate means 16. Preferably the first lip means 30 will be oriented at an angle of 45 degrees to 90 degrees with respect to the first plate 16. The preferred angle is approximately 80 degrees.

In a similar manner a second lip means 36 may extend outwardly from the second outer edge 26 of second plate means 22 and may include a second abutment edge 40 remotely located from the second plate means 22. The second lip means 36 will preferably be at an angle 38 of 45 to 90 degrees and preferably 80 degrees with respect to the second plate means 22.

A shelf means 42 is selectively mountable with respect to the bracket means 14. Shelf means 42 may include a floor member 44 which may have a ribbing 46 thereon to facilitate placement of articles thereon and to facilitate draining of water thereoff.

Shelf means 42 may include a mounting means 48 behind the floor member 44 in position adjacent to the wall corner to which the shelf will be mounted. The rear portion of shelf 42 may include a first abutment surface 50 adapted to be positioned adjacent to the first wall surface 10 as well as a second abutment surface 52 adapted to be positioned adjacent second wall surface 12. Preferably first abutment surface 50 and second abutment surface 52 will be at approximately 90 degrees with respect to one another.

Mounting means 48 preferably includes a mounting recess 54 defined adjacent the intersection between first abutment surface 50 and second abutment surface 52 in such a manner as to define therein a first slot means 56 adjacent the first abutment surface 50 and a second slot means 58 adjacent the second abutment surface 52. The bracket means 14 is adapted to have the first lip means 30 and the second lip means 36 thereof detachably securable into first slot means 56 and second slot means 58, respectively.

To facilitate mounting of the bracket 14 with respect to the first wall surface 10 and the second wall surface 12 the first plate means 16 may define a first mounting hole means 60 therethrough. Similarly the second plate means 22 may define a second mounting hole means 62 therein. Preferably screw mounting studs 72 will be adapted to extend through the first mounting hole means 60 and a second mounting hold means 62 to extend into firm securement with the first wall surface 10 and the second wall surface 12 in such a manner as to fixedly secure the bracket 14 with respect to the first and second wall surfaces 10 and 12.

To facilitate fixed securement between the bracket 14 and the mounting means 48 the first slot means 56 will preferably include a first innermost corner 64 and the second slot means 58 will preferably include a second innermost corner 66. The first innermost corner 64 will preferably be engageable with respect to the first abutment edge 34 of first lip means 30. In a similar manner the second innermost corner 66 will preferably be capable of abutment with respect to the second abutment edge 40 of second lip means 36. In this manner with the first lip means 30 installed in position within first slot 56 and the second lip means 36 installed in position within the second slot means 58 the fixed engagement of the first abutment edge 34 with respect to the first mounting hole 60 and of the second abutment edge 40 with respect to the second innermost corner 66 a fixed engagement of the shelf with respect to the surrounding wall will be achieved.

To further enhance the fixed securement between the bracket and the mounting slots the mounting means 48 will be oriented such that the distance 68 between first innermost corner 64 and second innermost corner 66 is somewhat greater than the distance 70 between first abutment edge 34 and second abutment edge 40. With the bracket 14 chosen of a heat treated steel material or other similar material which tends to retain shape, it will be possible to provide some outward flexing of the first abutment edge 34 with respect to the second abutment edge 40 during insertion of the bracket 14 into the first and second slots 56 and 58. This slight outward flexing will result with the installed configuration having a force being exerted by the first abutment edge 34 against the first innermost corner 64 and the second abutment edge 40 against the second innermost corner 66 in such a manner as to facilitate firm securement of the bracket 14 with respect to the shelf 42.

Although any type of material is capable of being used for the mounting bracket 14 it is found to be preferable to use a heat tempered metal. Also the first angle 32 of the first lip means 30 with respect to the first plate 16 and the second angle 38 of the second lip 36 with respect to the second plate 22 can be anywhere from 45 degrees to 90 degrees to facilitate firm securement with respect to the first innermost corner 64 and the second innermost corner 66, however, the preferred angle for each lip means is approximately 80 degrees with respect to the adjacent plate means. This has been shown to be the best overall configuration for facilitating strength of mounting.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A corner shelf assembly adapted to be mounted to a wall corner having a first wall surface and a second wall surface, said corner shelf assembly comprising:
    (a) a bracket means including:
        (1) a first plate means being securable with respect to the first wall surface, said first plate means including a first inner edge and a first outer edge;
        (2) a second plate means being securable with respect to the second wall surface, said second plate means including a second inner edge and a second outer edge, said second inner edge being attached with respect to said first inner edge with said second plate means and said first plate means being at an angle of approximately ninety (90) degrees with respect to one another;
        (3) a first lip means attached with respect to said first outer edge of said first plate means and extending outwardly therefrom at an angle of 45 to 90 degrees with respect thereto, said first lip means defining a first abutment edge at the outermost end thereof spatially disposed with respect to said second plate means;
    (b) a shelf means including:

(1) a floor member extending generally horizontally to provide a surface for placement of articles upon said shelf means;

(2) a rear mounting section secured to said floor member and extending rearwardly therefrom;

(3) a mounting means located on said rear mounting section and which includes:

(a) a first abutment wall including a first abutment surface positionable in abutment with the first wall surface;

(b) a second abutment wall including a second abutment surface positionable in abutment with the second wall surface and being at approximately ninety (90) degrees with respect to said first abutment surface to provide continuous abutment of said corner shelf assembly with respect to the surrounding wall corner surfaces;

said mounting means defining a mounting recess positioned between said first abutment surface and said second abutment surface adapted to receive said bracket means therein to be fixedly secured thereto to mount said shelf means fixedly with respect to the wall corner with said first abutment surface in abutment with respect to the first wall surface and with said second abutment surface in abutment with respect to the second wall surface, said mounting recess being large enough to completely receive said bracket means therein to facilitate flush contact of the first abutment surface with respect to the first wall surface and of said second abutment surface with respect to the second wall surface;

(c) a first slot means located within said mounting recess adjacent said first abutment surface, said first slot means being adapted to receive said first lip means fixedly secured therein; and (d) a second slot means located within said mounting recess adjacent said second abutment surface, said second slot means being adapted to receive said second lip means fixedly secured therein.

2. The corner shelf assembly as defined in claim 1 wherein said first plate means, said first lip means, said second lip means and said second plate means are integral with respect to one another.

3. The corner shelf assembly as defined in claim 2 wherein said first plate means and said second plate means are made of metal.

4. The corner shelf assembly as defined in claim 3 wherein said first and second plate means are heat tempered for additional strength.

5. The corner shelf assembly as defined in claim 1 wherein said first plate means defines first mounting hole means therein and said second plate means defines second mounting hole means therein to facilitate mounting thereof with respect to the first wall surface and the second wall surface.

6. The corner shelf assembly as defined in claim 5 further comprising screw mounting studs adapted to be affixed extending through said first and second mounting hole means defined in said first and second plate means.

7. The corner shelf assembly as defined in claim 1 wherein said first lip means is oriented at an angle of approximately eighty degrees with respect to said first plate means and wherein said second lip means is oriented at an angle of approximately eighty degrees with respect to said second plate means.

8. The corner shelf assembly as defined in claim 1 wherein said first slot means defines a first innermost corner and wherein said second slot means defines a second innermost corner, said first abutment edge of said first lip means being adapted to engage said first innermost corner and said second abutment edge of said second lip means being adapted to engage said second innermost corner to fixedly engage said mounting means with respect to said bracket means.

9. The corner shelf assembly as defined in claim 8 wherein the distance between said first innermost corner and said second innermost corner of said mounting means is greater than the distance between said first abutment edge and said second abutment edge to provide for some flexing of said first abutment edge and said second abutment edge outwardly with respect to one another during installation of said shelf means thereon to facilitate firm engagement of said mounting means with respect to said bracket means.

10. The corner shelf assembly as defined in claim 1 wherein said bracket means is made of heat tempered steel.

11. The corner shelf assembly as defined in claim 1 wherein said bracket means is made of aluminum.

12. A corner shelf assembly adapted to be mounted to a wall corner having a first wall surface and a second wall surface, said corner shelf assembly comprising:

(a) a bracket means including;

(1) a first plate means of heat tempered steel being securable with respect to the first wall surface, said first plate means defining a first mounting hole means therein to facilitate securement of said first plate means with respect to the first wall surface, said first plate means including a first inner edge and a first outer edge;

(2) a second plate means of heat tempered steel being securable with respect to the second wall surface, said second plate means defining a second mounting hole means therein to facilitate securement of said second plate means with respect to the second wall surface, said second plate means including a second inner edge an a second outer edge, said second plate means being integral with said second plate means along said first inner edge and said second inner edge with said first plate means being at an angle of approximately ninety (90) degrees with respect to one another;

(3) screw mounting studs adapted to extend through said first mounting hole means and said second mounting hole means and be secured to the first wall surface and the second wall surface to facilitate attachment of said first plate means and said second plate means with respect thereto;

(4) a first lip means of heat tempered steel being integral with respect to said first outer edge of said first plate means and extending outwardly therefrom at an angle of approximately eighty (80) degrees with respect thereto, said first lip means defining a first abutment edge at the outermost end thereof spatially disposed with respect to said first plate means;

(5) a second lip means of heat tempered steel being integral with respect to said second outer edge of said second plate means and extending outwardly therefrom at an angle of approximately eighty (80) degrees with respect thereto, said second lip means defining a second abutment edge at the outermost end thereof spatially disposed with respect to said second plate means;

(b) a shelf means including:
  (1) a floor member extending generally horizontally to provide a surface for placement of articles upon said shelf means;
  (2) a rear mounting section secured to said floor member and extending rearwardly therefrom;
  (3) a mounting means located on said rear mounting section which includes:
    (a) a first abutment wall including a first abutment surface positionable in abutment with the first wall surface;
    (b) a second abutment wall including a second abutment surface positionable in abutment with the second wall surface and being at approximately ninety (90) degrees with respect to said first abutment surface to provide continuous abutment of said corner shelf assembly with respect to the surrounding wall corner surfaces;
  said mounting means defining a mounting recess positioned between said first abutment surface and said second abutment surface adapted to completely receive said bracket means therein to be fixedly secured thereto to mount said shelf means fixedly with respect to the wall corner with said first abutment surface in complete abutment with respect to the first wall surface and with said second abutment surface in complete abutment with respect to the second wall surface;

(c) a first slot means located within said mounting recess adjacent said first abutment surface, said first slot means being adapted to receive said first lip means fixedly secured therein, said first slot means defining a first innermost corner adapted to receive said first abutment edge of said first lip means fixedly engaged therein to facilitate engagement between said bracket means and said mounting means; and (d) a second slot means located within said mounting recess adjacent said second abutment surface, said second slot means being adapted to receive said second lip means fixedly secured therein, said second slot means defining a second innermost corner adapted to receive said second abutment edge of said second lip means fixedly engaged therein to facilitate engagement between said bracket means and said mounting means, the spatial distance between said first innermost corner and said second innermost corner of said mounting means being greater than the distance between said first abutment edge and said second abutment edge to provide for some flexing of said first abutment edge and said second abutment edge outwardly with respect to one another during installation of said shelf means thereon to further facilitate firm engagement of said mounting means with respect to said bracket means.

* * * * *